(12) United States Patent
Lorenz

(10) Patent No.: US 10,538,309 B2
(45) Date of Patent: Jan. 21, 2020

(54) SYSTEM FOR DRIVING AND GUIDING OF A TRAILING EDGE CONTROL SURFACE

(71) Applicant: Airbus Operations GmbH, Hamburg (DE)

(72) Inventor: Florian Lorenz, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 316 days.

(21) Appl. No.: 15/716,916

(22) Filed: Sep. 27, 2017

(65) Prior Publication Data

US 2018/0093756 A1    Apr. 5, 2018

(30) Foreign Application Priority Data

Sep. 30, 2016 (EP) .................................... 16191862

(51) Int. Cl.
*B64C 9/02* (2006.01)
*B64C 9/16* (2006.01)

(52) U.S. Cl.
CPC . *B64C 9/02* (2013.01); *B64C 9/16* (2013.01)

(58) Field of Classification Search
CPC .... B64C 9/02; B64C 9/04; B64C 9/16; B64C 2009/005; B64C 3/48; B64C 3/50
USPC ........................................................ 244/215
See application file for complete search history.

(56) References Cited

U.S. PATENT DOCUMENTS

| | | | |
|---|---|---|---|
| 2,555,862 A | 6/1951 | Romani | |
| 3,140,066 A * | 7/1964 | Sutton | B64C 9/02 244/215 |
| 3,438,597 A * | 4/1969 | Kasper | B64C 3/52 244/13 |
| 4,460,138 A * | 7/1984 | Sankrithi | B64C 9/18 244/215 |
| 6,145,791 A * | 11/2000 | Diller | B64C 3/48 244/130 |
| 6,173,924 B1 * | 1/2001 | Young | B64C 3/48 244/215 |

(Continued)

FOREIGN PATENT DOCUMENTS

| | | | | |
|---|---|---|---|---|
| EP | 3301018 A1 * | 4/2018 | ............... | B64C 9/16 |
| EP | 3505451 A1 * | 7/2019 | ............... | B64C 3/38 |

(Continued)

OTHER PUBLICATIONS

European Patent Office, European Search Report for Application No. EP 16 191 862.8 dated Apr. 24, 2017.

*Primary Examiner* — Christopher P Ellis
(74) *Attorney, Agent, or Firm* — Lorenz & Kopf LLP

(57) ABSTRACT

A system for driving and guiding a trailing edge control surface arranged on a wing of an aircraft includes a first guide device attachable to the wing and coupled with an inboard section of the control surface for guiding the inboard section along a trajectory relative to the trailing edge region of the wing between a retracted position and an extended position, a second guide device attachable to the wing and holding a connecting means of an outboard section of the control surface, and a drive device attachable to the wing and the control surface for moving the control surface. The trajectory is a spatial path at least along one dimension, wherein a distance between the inboard section of the control surface and a fixed part of the wing changes during a motion of the inboard section on the trajectory.

14 Claims, 3 Drawing Sheets

(56) References Cited

U.S. PATENT DOCUMENTS

| | | | | |
|---|---|---|---|---|
| 6,209,824 B1 * | 4/2001 | Caton | ............... | B64C 7/00 |
| | | | | 244/213 |
| 6,299,109 B1 * | 10/2001 | Stephan | ............. | B64C 9/32 |
| | | | | 244/215 |
| 2007/0034748 A1 * | 2/2007 | Sakurai | ............. | B64C 9/16 |
| | | | | 244/215 |
| 2009/0001223 A1 * | 1/2009 | Grohmann | ............. | B64C 3/48 |
| | | | | 244/213 |
| 2009/0134281 A1 | 5/2009 | Engelbrecht et al. | | |
| 2010/0096497 A1 | 4/2010 | Macgregor | | |
| 2011/0001015 A1 * | 1/2011 | Kracke | ............. | B64C 9/02 |
| | | | | 244/213 |
| 2013/0256461 A1 * | 10/2013 | Maenz | ............. | B64C 9/02 |
| | | | | 244/213 |
| 2013/0320152 A1 * | 12/2013 | Parker | ............. | B64C 9/02 |
| | | | | 244/90 A |
| 2014/0097292 A1 * | 4/2014 | Hauber | ............. | B64C 9/04 |
| | | | | 244/99.2 |
| 2016/0161949 A1 * | 6/2016 | Lam | ............. | B64C 9/04 |
| | | | | 701/7 |
| 2018/0111675 A1 * | 4/2018 | Buttolph | ............. | B64C 3/56 |
| 2018/0362147 A1 * | 12/2018 | Huynh | ............. | B64C 9/20 |
| 2019/0055002 A1 * | 2/2019 | Bekircan | ............. | B64C 3/38 |
| 2019/0233085 A1 * | 8/2019 | Akel | ............. | B64C 9/16 |
| 2019/0283863 A1 * | 9/2019 | Bowers | ............. | B64C 13/30 |

FOREIGN PATENT DOCUMENTS

| | | | | |
|---|---|---|---|---|
| GB | 417898 A * | 10/1934 | ............. | B64C 9/00 |
| GB | 595299 A * | 12/1947 | ............. | B64C 9/04 |
| GB | 2561874 A * | 10/2018 | ............. | B64C 3/50 |
| WO | WO-9640553 A1 * | 12/1996 | ............. | B64C 3/48 |
| WO | 2009150445 A1 | 12/2009 | | |
| WO | 2012 045 796 A1 | 4/2012 | | |

* cited by examiner

US 10,538,309 B2

SYSTEM FOR DRIVING AND GUIDING OF A TRAILING EDGE CONTROL SURFACE

CROSS-REFERENCE TO PRIORITY APPLICATION

This application claims the benefit of, and priority to, European patent application number 16191862.8, filed Sep. 30, 2016. The entire content of this priority application is incorporated by reference herein.

TECHNICAL FIELD

Embodiments of the subject matter described herein relate generally to a system for driving and guiding of a trailing edge control surface arranged on a trailing edge region of a wing of an aircraft, a method for moving a trailing edge control surface relative to a trailing edge region of a wing of an aircraft, and an aircraft having a wing and at least one system for driving and guiding of a trailing edge control surface arranged on a trailing edge region of the wing.

BACKGROUND

Wings of civil aircraft are often equipped with a plurality of different control surfaces, which are movably supported on the wing. During flight, the control surfaces are exposed to an airflow and, depending on their orientation to the wing and thus to the airflow surrounding the wing, produce a force with a certain magnitude and direction.

For example, control surfaces serve for increasing the surface area and camber of the wing in order to increase the lift coefficient are widespread and enable a reduction of required flow velocities particularly for facilitating take-off and landing. These "high-lift" surfaces are often arranged on further inboard regions and central regions of the wing. They may exemplarily be realized in the form of leading edge slats and/or trailing-edge flaps, which may be moved between a retracted position, in which they constitute a part of a clean wing, and an extended position, in which they may provide an enlarged surface area as well as a gap to a main wing structure.

Different support and guiding devices are known for moving the trailing edge flap between the retracted and extended positions. A possible mechanism for guiding a high-lift flap relative to a trailing edge region of a wing is the so-called "dropped hinge", in which the flap rotates around a fixed hinge line at a distance to the flap. A common layout includes an inboard flap having two flap supports and one outboard flap having two flap supports. The outboard flap usually has a tapered form, i.e. the profile depth decreases in an outboard direction. The rotation of the flap around the above-mentioned hinge line is adapted to the tapered form of the flap, such that the inboard support of the outboard flap conducts a cyclic rotation with a larger diameter than the outboard support. This leads to a motion of the flap on a conical surface section with a virtual tip of the conus outboard of the wing tip.

As an example, patent document WO 2012 045 796 A1 shows a high-lift system for a wing of an aircraft, comprising movably held high-lift flaps, at least one drive unit, at least one transmission shaft connected to the drive unit, and several actuator devices, distributed on the transmission shaft and connected to the high-lift flaps, for moving the high-lift flaps.

BRIEF SUMMARY

Providing different kinematics on two supports of a single trailing edge flap may be relatively complex. It may therefore be desirable to propose a drive system for driving a trailing edge control surface, which includes a flap with a tapered form and which has a reduced complexity in comparison to common solutions.

Certain objectives and advantages are met by a system according to claim 1. Advantageous embodiments and further improvements may be gathered from the sub-claims and the following description.

It is proposed a system for driving and guiding of a trailing edge control surface arranged on a trailing edge region of a wing of an aircraft. The system comprises a first guide device attachable to the wing and coupled with an inboard section of the control surface for guiding the inboard section of the control surface along a predetermined trajectory relative to the trailing edge region of the wing between a retracted position and at least one extended position. The system further comprises a second guide device fixedly attachable to the wing and holding a connecting means (e.g., a suitably configured device, element, feature, or structure) of an outboard section of the control surface. The system also comprises a drive device couplable with the wing and the control surface for moving the control surface. The trajectory is a spatial path at least along one dimension, wherein a distance between the inboard section of the control surface and a fixed part of the wing changes during a motion of the inboard section on the trajectory. The second guide device is designed to swivably hold the connecting means of the outboard section of the control surface under prevention of a translatory motion of the connecting means relative to the wing.

The system according to an embodiment of the invention provides a completely different concept compared to solutions known from the prior art. The use of a combination of the first guide device and the second guide device as defined above allow to remove a comparatively complex guide and support apparatus for one side of the trailing edge control surface in question. Consequently, the system according to an embodiment of the invention simplifies the guiding of the trailing edge control surface. The core components are explained in the following.

The trailing edge control surface may comprise a tapered shape having a cord that decreases in an outboard direction to compensate the commonly tapered shape of the wing at least in an outboard region. The first guide device is positioned at or near a lateral end of the control surface, which is positioned further inboard than the other lateral end, which is coupled with the second guide device. The first guide device provides a guiding function along a predetermined trajectory, such that the inboard section of the control surface may be moved further from or nearer to a main structure of the wing. For example, the trajectory may be linear or curved, such that the inboard section of the control surface at least conducts a translatory motion.

The first guide device may be realized through different means, which are known from the prior art.

For example, the first guide device may comprise a dropped hinge mechanism, which is based on a hinge axis arranged underneath an underside of the wing and/or the trailing edge control surface in a fully retracted position. For example, two rigid links may be coupled with two different chordwise joints of the control surface and are swivably supported around the set hinge axis. Hence, depending on the spatial orientation and position of the hinge axis, the trailing edge control surface conducts a combined translatory and rotary motion.

Also, the first guide device may comprise a rail supported on a track beam, a carriage movably supported on the rail as well as a rear lever, wherein the carriage and the lever are swivably mounted on two different chordwise joints and the rear link is swivably mounted on a rear end of the track beam. Consequently, e.g. a forward portion of the control surface is supported by the carriage along the rail. A rear end of the control surface is held by the rear link in a constant distance to the rear end of the track beam. Resultantly, a combined translatory and rotational motion is conducted.

Due to the tapered shape of the trailing edge control surface, a motion of an outboard section does not necessarily have to comprise the same dimensional extensions. The second guide device now is arranged at an outboard end region of the wing, which is simply coupled with a connecting means of the outboard section of the control surface, such that only a swiveling motion around the second guide device can be accomplished. This means that the further inboard situated first guide device provides a distinct motion preferably in a chordwise direction, while the second guide device merely acts as a support and tolerates a different orientation of the trailing edge control surface relative to the wing.

A complex guide device for an outer side in analogy to the first guide device can therefore be omitted. The total weight of the system according to an embodiment of the invention is lower than that of a common system, which uses two guide devices, which are designed corresponding to the above-mentioned first guide device.

The design of the second guide device is confronted with only a minimum of design constraints. These may depend on the design of the first guide device. Since the second guide device merely needs to support the outer section of the control surface, the second guide device only needs to compensate the spatial orientation of the control surface. In the unlikely case of a purely translatory motion of the inboard section of the control surface, the second guide device may simply be designed as a joint with a single degree of freedom of rotation around a single axis, which is preferably arranged perpendicular to the linear extension of the first guide device.

In the more likely case of a combined translatory and rotational motion of the inboard section of the control surface, the second guide device should at least comprise two rotational degrees of freedom. For example, these may be realized in the form of two hinge axes which are at an angle to each other. Alternatively, these may be realized by a universal joint or a spherical bearing.

In a preferred embodiment, the first guide device comprises a joint, which is arranged at a distance to the underside of the wing, around which joint the control surface rotates by moving the drive device. The first guide device therefore constitutes a dropped hinge mechanism, which is mechanically relatively simple, but allows the control surface to increase the surface area of the wing as well as its camber, wherein its behavior is adjustable by providing a suitable position of the hinge in both a longitudinal (chordwise) as well as a vertical position relative to the wing.

In another embodiment, the first guide device comprises a rail supported on a track beam, a carriage movably supported on the rail as well as a rear link swivably coupled to a rear end of the track beam, wherein the carriage and an end of the rear link opposite to the track beam are swivably coupled with two joints of the control surface at two different chordwise positions. Such a flap track mechanism is also commonly used and may provide for trajectories with a more complex shape.

In a still further embodiment, the first guide device may comprise a multi-link chain with a plurality of rigid links swivably coupled with a support structure connectable to the wing and two joints on the control surface at two different chordwise positions of the control surface.

For all these different kinematics it may be advantageous that the second guide device comprises a swiveling joint with at least two different hinge axes. This means that a component attached to or coupled with the second guide device is capable of providing a rotation around both hinge axes independently.

In a preferred embodiment, the second guide device comprises a spherical bearing, which allows a rotation around virtually any spatially oriented axis.

In a still further embodiment, the second guide device may include a linear compensation device, which allows a compensation of the control surface motion in a direction parallel to a leading edge of the control surface. For example, the second guide device may comprise an axis that protrudes from the second guide device in a direction parallel to the leading edge of the control surface, which axis extends through a bushing. Also, the second guide device may comprise a bushing, through which an axis extends, which is connected to the control surface and extends in a direction parallel to the leading edge. Both combinations of axis and bushing should allow to provide a linear motion along a direction parallel to the leading edge of the control surface. Hence, constraint forces between the control surface and the second guide device caused by moving the inboard section of the control surface can be eliminated.

In an advantageous embodiment, one of the second guide device and the connecting means compromises a mechanism which allows a free rotation around at least one axis. The mechanism may include an arbitrary joint, a hinge or another suitable component, which allows to provide such a free rotation. Additionally, one of the second guide device and the connecting means may include a combination of two or more such components in order to achieve the desired degree of rotational freedom.

In this regard it is stated that the term "one of the second guide device and the connecting means" is used to also include a system, in which the "connecting means" is able to provide the desired degree of rotational freedom, while the second guide device is merely a fixed element to receive the connecting means.

Furthermore, the second guide device is at least partially positioned inside an air foil structure of the wing. The air foil structure may be considered a part of the wing, which comprises an upper and a lower skin, which together define the shape of the air foil, i.e. the aerodynamic surface. By at least partially positioning the second guide device inside the air foil structure, a clean configuration with a retracted control surface does not comprise any additional components, which may influence the air flow around the wing, in comparison to common systems.

The second guide device may be located between an outboard lateral end of the control surface and a lateral inboard end of a fixed trailing edge section of the wing directly adjacent the outboard lateral end of the control surface. A strong structural modification of the trailing edge section of the wing is not necessary and both components may be designed to provide an as compact combination as possible.

Further, the second guide device may be positioned in or directly adjacent to the focal point of the trajectory of the control surface. As described above, the control surface is guided by the first guide device on a trajectory, which is based on a conical motion in the prior art, but with a focal point or an apex of the cone described by the conical motion being positioned within the dimensional extension of the wing and particularly at an outboard end of the wing. The second guide device, which receives the connecting means of the control surface, may be placed very near or partly inside the airfoil or completely in the airfoil outboard the control surface. Hence, the overall motion of the control surface is very smooth around this focal point and the second guide device, respectively.

As an alternate solution the first guide device may be adapted for compensating the control surface motion in a direction parallel to a leading edge of the control surface. This may be conducted through a variety of different means, which depend on the mechanical type of the first guide device. For example, the dropped hinge construction itself may comprise a spherical bearing, which provides the dropped hinge itself and which is also capable of compensating a transversal motion. The flap track mechanism may comprise a hinge at a track beam with a hinge axis substantially vertical, in order to compensate transversal motion.

In an advantageous embodiment, one of the second guide device and the connecting means is adapted for moving along a linear axis relative to the other one of the second guide device and the connecting means. The linear axis may particularly be parallel to the leading edge of the control surface, such that the width between the inboard section of the control surface and the attachment position of the second guide device is variable. This allows to prevent constraint forces.

One of the second guide device and the connecting means may comprise an elongate component and the other one of the second guide device and the connecting means comprises a component having an opening for receiving the elongated component. This simplifies the installation and leads to a sufficiently determined support of the control surface.

Further, the elongate component may be movable along its extension axis in the opening of the second guide device. This simply provides a motion compensation function.

An embodiment of the invention further relates to an aircraft having a wing with at least one of the above-mentioned drive systems. For example, the wing may comprise at least one inboard trailing edge control surface and one outboard trailing edge control surface per side of the wing. The inboard control surfaces each comprise two first guide devices in accordance with the above description. The outboard control surface, however, only comprises one first guide device and one second guide device in accordance with the above description.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications will become apparent from the following description of the exemplary embodiments illustrated in the figures. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
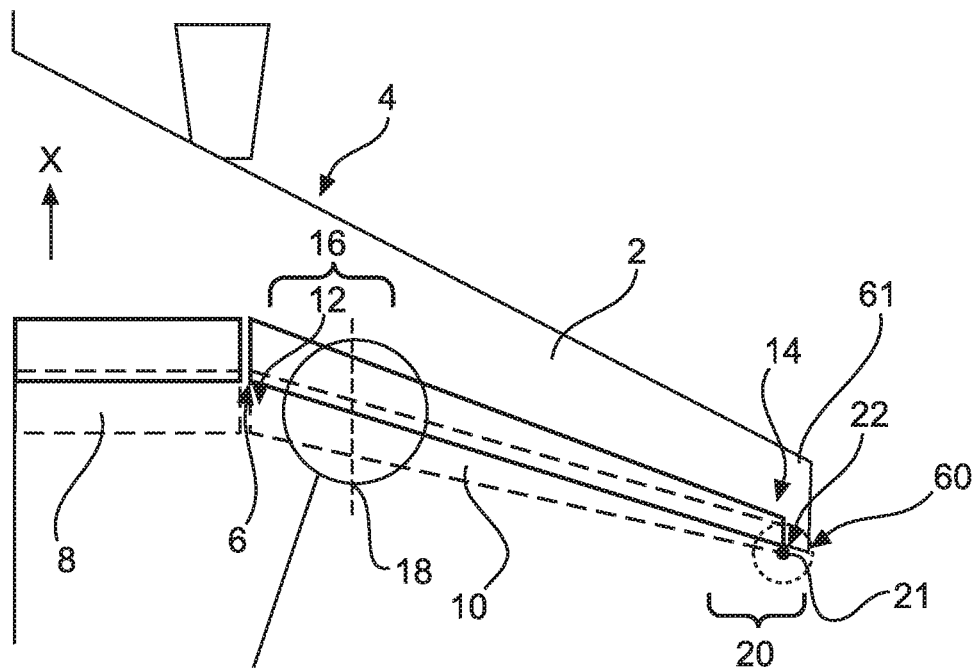
FIG. 1 shows a wing equipped with a system according to an embodiment of the invention in a top view.

FIG. 1 shows a wing 2 of an aircraft having a leading edge 4 and a trailing edge region 6. At an inboard region of the wing 2, an inboard trailing edge control surface 8 is movably supported on the wing 2. It may be moved along an x-direction, which is the longitudinal axis of the aircraft.

At a further outboard region, an outboard trailing edge control surface 10 is present, which comprises an inboard end 12 and an outboard end 14. In an inboard section 16 of the control surface 10, a first guide device 18 is present, which is indicated through dashed lines for the sake of simplicity. In an outboard section 20 of the control surface 10, a second guide device 22 is present.

The first guide device 18 provides a guiding of the inboard section 16 along an x-direction. The second guide device 22 in turn only holds the outboard section 20 and allows a rotation around a rotation point 21. A linear motion of the outboard section 20 is inhibited or prevented.

By moving the outboard trailing edge control surface 10 along the first guide device 18 relative to the trailing edge region 6, the inboard end 12 of the control surface 10 is moved between a retracted and at least one extended position. Due to the use of a fixedly installed second guide device 22, the outboard end 14 of the control surface 10 always remains at the point 21, but follows the motion of the inboard end 12 through a rotation.

Thus, the control surface 10 provides a conical motion, wherein a focal point or an apex of the cone described by the conical motion remains in the dimensional extension of the wing 2, i.e. at the point 21. The attachment of the control surface 10 to the second guide device 22 is explained further below.

Consequently, the setup of the wing 2 is much more simple in comparison with common concepts.

Figure 2:
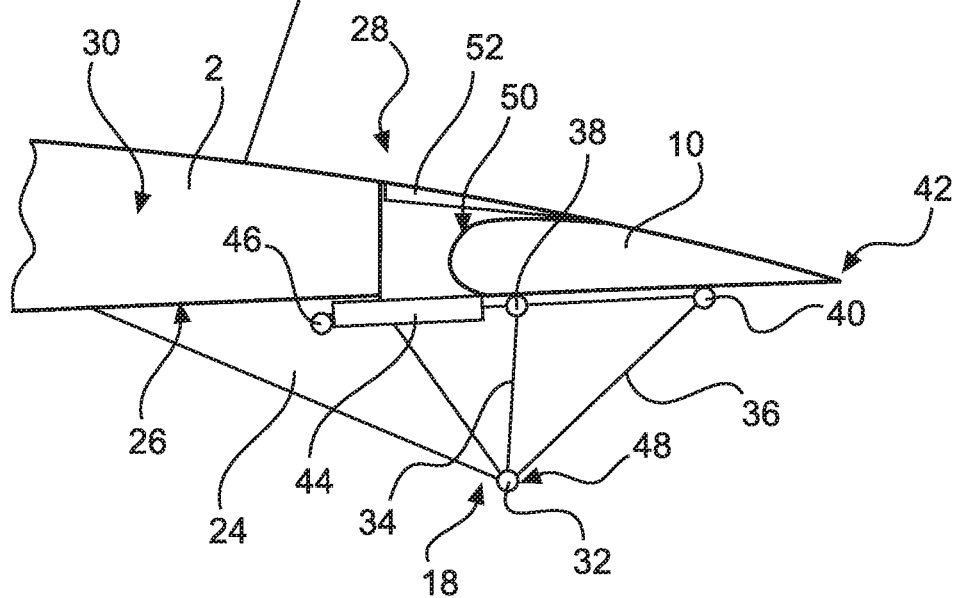
FIG. 2 shows a lateral section of the wing at a first guide device.

FIG. 2 shows a lateral sectional view on the wing 2, the trailing edge control surface 10 and the first guide device 18. Here, a support structure 24 is attached to an underside 26 of the wing 2 and extends over a trailing edge 28 of a main wing structure 30. The trailing edge control surface 10 is arranged behind the trailing edge 28 of the main wing structure 30 and is shown in a retracted position, in which the wing 2 has a clean configuration.

At an outer end 32 of the support structure 24, a joint 32 is placed, to which a first link 34 and a second link 36 are connected and swivably supported. Both links 34 and 36 are coupled with a forward joint 38 and a rearward joint 40 of the control surface 10, wherein both joints 38 and 40 are provided at two different chordwise positions. Still further, a drive device 44 in form of an actuator is present, which is swivably mounted on an actuator support 46 on the support structure 24 and with the joint 38 of the control surface 10. By extending and retracting the actuator 44, the control surface 10 rotates around the joint 32, which defines a hinge axis 48.

Above a leading edge 50 of the control surface 10, a spoiler 52 is present, which extends in the direction of a trailing edge 42 of the control surface 10. The combination of main structure 30, spoiler 52 and trailing edge control surface 10 provide a clean wing configuration. The motion of the inboard end 12 of the control surface 10 is comparable to the motion of a common trailing edge flap of an aircraft.

Figure 3A:
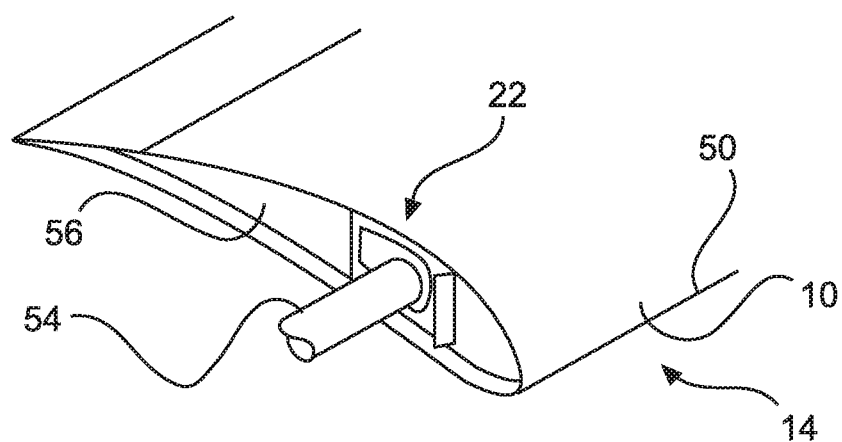
FIGS. 3a to 3c show details of a control surface and its connection to a second guide device on a fixed wing structure in different views.

FIG. 3a shows the outboard end 14 of the control surface 10 in a three-dimensional view. Here, an axis 54 is shown, which protrudes out of an outboard end 56 of the control surface 10. The axis 54, which is an elongated component, is couplable with the second guide device 22 through inserting it into at least one hole of the second guide device 22. Through the use of such an axis 54, a compensation of a transversal motion, i.e. a motion along a leading edge 50 of the control surface 10, is possible.

Figures 3B, 3C:
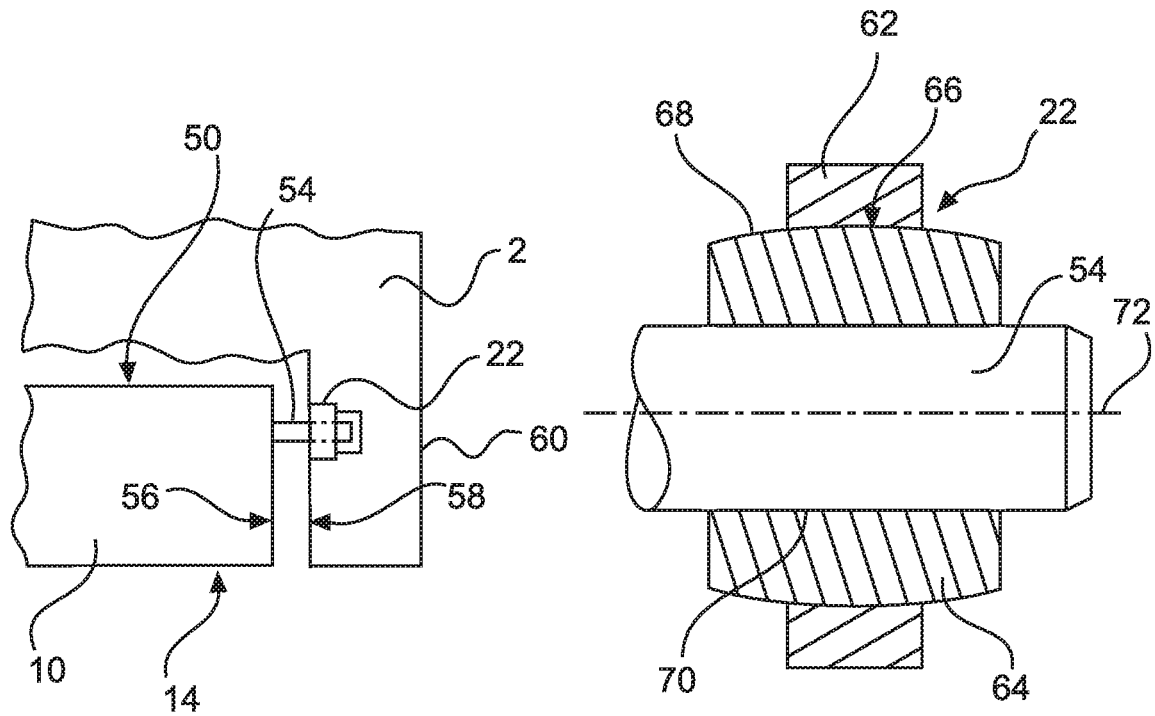

In FIG. 3b a possible position of the second guide device 22 at a lateral inboard end 58 of a fixed trailing edge section 60 of the wing 2 is shown. The trailing edge section 60 is or constitutes a part of an air foil structure 61. Exemplarily, the second guide device 22 is inside the air foil structure 61.

The connecting means in form of the axis 54 protrudes from the lateral outboard end 56 of the control surface 10 into the second guide device 22 to couple both components with each other. For the purpose of simplicity, additional means for securing the axis 54 and the second guide device 22 are not shown. This is not to be interpreted as a limitation of the design of the system according to an embodiment of the invention.

FIG. 3c shows a very simple setup of a second guide device 22 in form of a spherical bearing, which comprises a cage 62 and a bearing body 64, which comprise matching surfaces 66 and 68 that allow a spherical motion relative to each other. The bearing body 64 comprises a through-hole 70, which is designed to receive the axis 54. If desired, the axis 54 may move along its extension axis 72 within the through-hole 70.

It is also conceivable, that the second guide device 22 and the connecting means 54 may be swapped, such that the spherical bearing is attached to the control surface 10 and is named "connecting means", while the axis 54 is attached to the fixed wing structure 60 and is coupled with the spherical bearing. The axis then guides the outboard end 14 of the control surface 10 around the point 21, as described above.

Figure 4A:
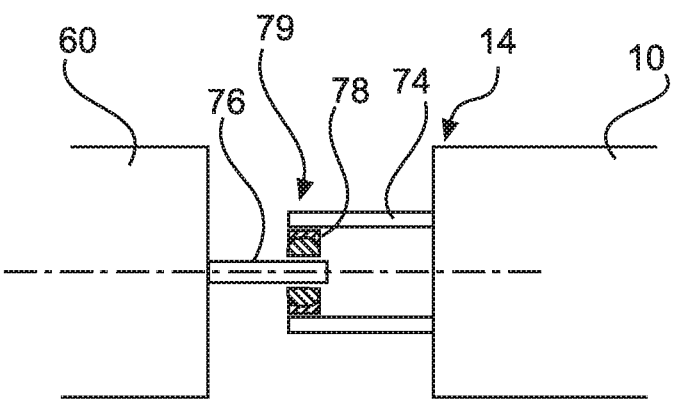
FIGS. 4a and 4b show another example for coupling the control surface to a second guide device on a fixed structure of a wing.

In FIGS. 4a, the outboard end 14 of the control surface 10 is equipped with a fork 74, which holds a spherical bearing 78 comparable to the one shown in FIG. 3c. Here, the spherical bearing 78 may constitute a part of a connecting means 79, as it is fixed to the flap 10.

A second guide device 76 mainly comprises an axis, which is inserted into the spherical bearing 78, in order to guide it around the fixed trailing edge section 60.

It is also conceivable to use a hollow tube or a bushing instead of a fork 74. However, a sufficient inner diameter is required to allow an unhindered movement of the axis 76.

Figure 4B:
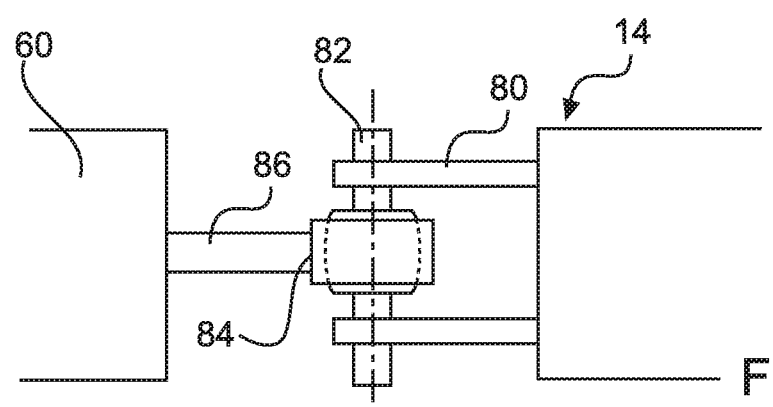

Kinematically inverse, FIG. 4b shows a fork 80 attached to the outboard end 14 of the control surface 10. The fork holds an axis 82. The fork 80 and the axis 82 constitute a connecting means 81. The axis 82 extends through a spherical bearing 84 as a second guide device, which in turn is held on the fixed trailing edge section 60 through a holder 86. The holder 86, in turn, may be a separate component or may integrally form a cage for the spherical bearing 84.

Figure 5:
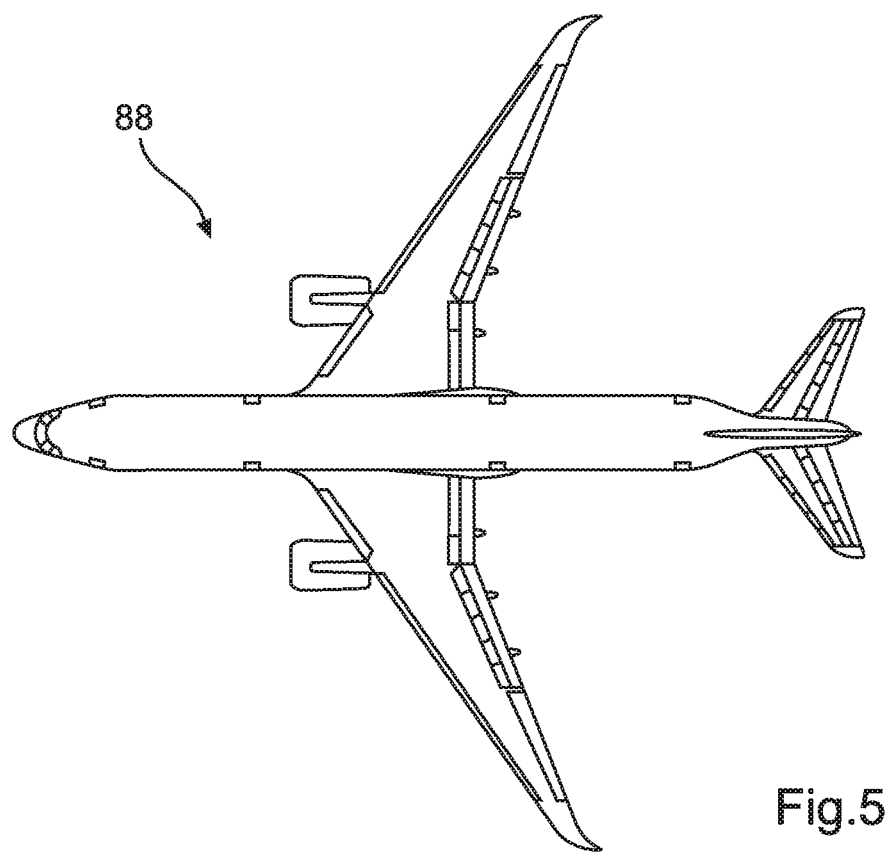
FIG. 5 shows an aircraft having a wing with a system according to an embodiment of the invention.

Finally, FIG. 5 shows an aircraft 88 having such a setup.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for driving and guiding of a trailing edge control surface arranged on a trailing edge region of a wing of an aircraft, the system comprising:
    a first guide device attached to the wing and coupled with an inboard section of the control surface for guiding the inboard section of the control surface along a predetermined trajectory relative to the trailing edge region of the wing between a retracted position and at least one extended position;
    a second guide device attached to the wing and holding a connecting means of an outboard section of the control surface; and
    a drive device fixedly attached to the wing and the control surface for moving the control surface;
    wherein the trajectory is a spatial path at least along one dimension, wherein a distance between the inboard section of the control surface and a fixed part of the wing changes during a motion of the inboard section on the trajectory; and
    wherein at least one of the second guide device and the connecting means is designed to swivably hold the connecting means of the outboard section of the control surface under prevention of a translatory motion of the connecting means relative to the wing.

2. The system of claim 1, wherein the first guide device comprises a joint, which is arranged at a distance to the underside of the wing, around which joint the control surface rotates by moving the drive device.

3. The system of claim 1, wherein the first guide device comprises a rail supported on a track beam, a carriage movably supported on the rail as well as a rear link swivably coupled to a rear end of the track beam, and wherein the carriage and an end of the rear link opposite to the track beam are swivably coupled with two joints of the control surface at two different chordwise positions.

4. The system of claim 1, wherein the first guide device comprises a multi-link chain with a plurality of rigid links swivably coupled with a support structure connectable to the wing and two joints on the control surface at two different chordwise positions of the control surface.

5. The system of claim 1, wherein one of the second guide device and the connecting means compromises a mechanism which allows a free rotation around at least one axis.

6. The system of claim 1, wherein the second guide device is at least partially positioned inside an air foil structure of the wing.

7. The system of claim 1, wherein the second guide device is located between a lateral outboard end of the control surface and a lateral inboard end of a fixed trailing edge section of the wing directly adjacent the lateral outboard end of the control surface.

8. The system of claim 1, wherein the second guide device is positioned in or directly adjacent to the focal point of the trajectory of the control surface.

9. The system of claim 1, wherein one of the second guide device and the connecting means comprises a spherical bearing, which allows a rotation around an arbitrary spatially oriented axis.

10. The system of claim 1, wherein one of the second guide device and the connecting means is adapted for compensating a motion of the control surface in a direction parallel to a leading edge of the control surface.

11. The system of claim 10, wherein one of the second guide device and the connecting means is adapted for moving along a linear axis relative to the other one of the second guide device and the connecting means.

12. The system of claim 11, wherein one of the second guide device and the connecting means comprises an elongate component and the other one of the second guide device and the connecting means comprises a component having an opening for receiving the elongate component.

13. The system of claim 12, wherein the elongate component is movable along its extension axis in the opening.

14. An aircraft having a wing with a system for driving and guiding of a trailing edge control surface arranged on a trailing edge region of the wing, the system comprising:
- a first guide device attached to the wing and coupled with an inboard section of the control surface for guiding the inboard section of the control surface along a predetermined trajectory relative to the trailing edge region of the wing between a retracted position and at least one extended position;
- a second guide device attached to the wing and holding a connecting means of an outboard section of the control surface; and
- a drive device fixedly attached to the wing and the control surface for moving the control surface;
- wherein the trajectory is a spatial path at least along one dimension, wherein a distance between the inboard section of the control surface and a fixed part of the wing changes during a motion of the inboard section on the trajectory; and
- wherein at least one of the second guide device and the connecting means is designed to swivably hold the connecting means of the outboard section of the control surface under prevention of a translatory motion of the connecting means relative to the wing.

* * * * *